United States Patent [19]

Suhr

[11] Patent Number: 4,894,926

[45] Date of Patent: Jan. 23, 1990

[54] DIPSTICK GUIDE

[76] Inventor: Robert N. Suhr, Marietta, Ga.

[21] Appl. No.: 317,814

[22] Filed: Mar. 1, 1989

[51] Int. Cl.$^4$ ............................................. G01F 23/04
[52] U.S. Cl. ....................................... 33/726; 33/722
[58] Field of Search .................. 33/721, 722, 723, 724,
33/725, 726, 727, 728, 729, 730, 731; 41/331,
332, 337, 339; 73/298, 294

[56] References Cited

U.S. PATENT DOCUMENTS

| | | | |
|---|---|---|---|
| 2,623,523 | 12/1952 | Benson | 141/331 |
| 2,728,070 | 12/1955 | Kelly | 73/298 |
| 2,812,784 | 11/1957 | Palmer | 141/331 |
| 4,155,167 | 5/1979 | DeLano | 33/726 |
| 4,266,344 | 5/1981 | Richardson | 33/726 |
| 4,510,690 | 4/1985 | Attler | 33/726 |
| 4,800,875 | 1/1989 | Ray | 141/331 |

FOREIGN PATENT DOCUMENTS

| | | | |
|---|---|---|---|
| 2547177 | 5/1977 | Fed. Rep. of Germany | 33/725 |
| 1099373 | 9/1955 | France | 33/722 |

*Primary Examiner*—William A. Cuchlinski, Jr.
*Assistant Examiner*—Thomas B. Will
*Attorney, Agent, or Firm*—Hurt, Richardson, Garner, Todd & Cadenhead

[57] ABSTRACT

A dipstick guide to aid in the insertion of a dipstick into a dipstick tube when measuring the level of oil in the engine or replacing the dipstick in the dipstick tube comprising an upper frusto-conical body whose side converges into one end of a smaller central body or tube portion, the other end of which then diverges into a lower body or frusto-conical skirt, smaller than the upper body, the two opposed frusto-conical bodies having sides which diverge in opposite directions from each other, and a slot extending axially along the length of the guide from one end to the other to allow removal of the guide, sidewise, when the dipstick has been partially inserted into the dipstick tube. An upstanding handle on the upper body facilitates the positioning of the dipstick guide onto the dipstick tube, and allows for the dipstick guide to be manually removed from the dipstick tube, and then moved out of the way of the dipstick.

11 Claims, 2 Drawing Sheets

DIPSTICK GUIDE

BACKGROUND OF THE INVENTION

1. Field of the Invention

This invention relates to an apparatus for aiding in the insertion of a dipstick into the dipstick tube of an engine of an automobile engine, and, more particularly, to a dipstick guide for aiding the insertion of an oil dipstick into a dipstick tube.

2. Discussion of the Prior Art

After one has removed the dipstick from the dipstick tube of an automobile engine, one is faced with the alpine task of replacing the dipstick in the dipstick tube. The dipstick tube generally has a small diameter and is generally placed in a nearly inaccessible location fairly low on the engine block and is often times hidden by wires, hoses, or other engine parts. This awkward location of the dipstick tube, coupled with the long and flexible nature of the dipstick, itself, and the dipstick handle being on an extreme end of the dipstick, makes it difficult to guide the dipstick into the dipstick tube.

In the past, there have been several methods for replacing the dipstick in the dipstick tube. One method involves grasping the dipstick by its handle and attempting to align the far end of the dipstick with the mouth of the tube for insertion therein. This is sometimes difficult, especially in poor light. Another method is to grasp the dipstick tube with one hand and guide the end of the dipstick down into the dipstick tube. In so doing, a person could burn his hands on the hot engine or hot oil and would probably get grease and oil on his hands.

In U.S. Pat. No. 4,155,167 an apparatus is disclosed which forms a more or less permanent guide attachment for the dipstick tube to guide the dipstick into the tube. This guide is designed to be left on the engine while the engine is operating. Additionally, the patent discloses a guiding light, a coil spring for elevating the guide into position to receive the dipstick, and a mounting bracket. Thus, the prior art guide is relatively expensive, is usually permanently installed on the engine and must remain with the engine to accumulate dirt which ultimately may be introduced into the oil in the engine. It may also fall off of the engine.

In U.S. Pat. No. 4,510,690, a split-sleeve type dipstick guide is disclosed which is mounted on the dipstick tube. The guide consists of a clamp for retaining the guide on the dipstick tube and moveable sleeve segments to receive the dipstick when inserted into the guide. The guide is designed to be attached to the dipstick tube and remain there while the engine is in use and has the potential of coming off and interfering with the operation of the engine.

SUMMARY OF THE INVENTION

Accordingly, it is an object of the present invention to provide a dipstick guide for engines that will facilitate the insertion of a dipstick into the dipstick tube of the engine.

Another object of the present invention is to provide a dipstick guide that can be readily and easily positioned for use on the end of the dipstick tube of the engine.

Another object of the present invention to provide a dipstick guide which can be removed from the dipstick tube and the dipstick, after the dipstick has been inserted part way into the dipstick tube, so that the dipstick thereafter may be fully inserted into and properly seated on the dipstick tube.

Another object of the present invention to provide a dipstick guide which is inexpensive to manufacture, durable in structure and efficient in operation.

Another object of the present invention to provide a dipstick guide which is free of moving parts and is readily removeable from the dipstick tube either during engine oil level measurement or after such a measurement has taken place.

These objects and others are accomplished by the dipstick guide of the present invention which, generally speaking, is a hollow, tubular, "dumbbell" shaped member with opposed, outwardly diverging ends. On the upper end of the enlarged frusto-conical upper body is a wide mouth or entrance opening, which is of larger diameter than the diameter of the dipstick tube, the upper body having sloping surfaces converging to and merging with the outer end portion of a generally cylindrical neck or central body, the neck having a diameter throughout its length which is slightly smaller than the diameter of the entrance end portion of the dipstick tube. The other or lower, end portion of the neck or central body merges into the small end of a frusto-conical outwardly diverging lower body or skirt. This skirt terminates in a wider bottom mouth which is of larger diameter than the diameter of the dipstick tube, the skirt being used to position the dipstick guide on the dipstick tube.

A continuous slot or opening extends axially throughout the length of the guide member from the top or mouth of the upper frusto-conical body down along the side of the neck or central body and, thence, along the side of the skirt or bottom body. This slot or axial opening serves a triple function of (1) allowing the guide to be removed from the dipstick when the dipstick is partially inserted into the dipstick tube, (2) permitting the dipstick guide to expand, within elastic limits, if the guide is forced down on the end portion of the dipstick tube, and (3) enabling the neck to frictionally engage the end portion of the dipstick tube so that the dipstick guide is removeably supported on this end portion. Additionally, the present invention includes a handle so that a person may more easily position the dipstick guide on the end portion of the dipstick tube.

Other objects, features, and advantages of the present invention will become apparent from the following description when taken in conjunction with the accompanying drawing wherein like characters of reference designate corresponding parts throughout the several views.

DETAILED DESCRIPTION OF A PREFERRED EMBODIMENT

Figure 1:
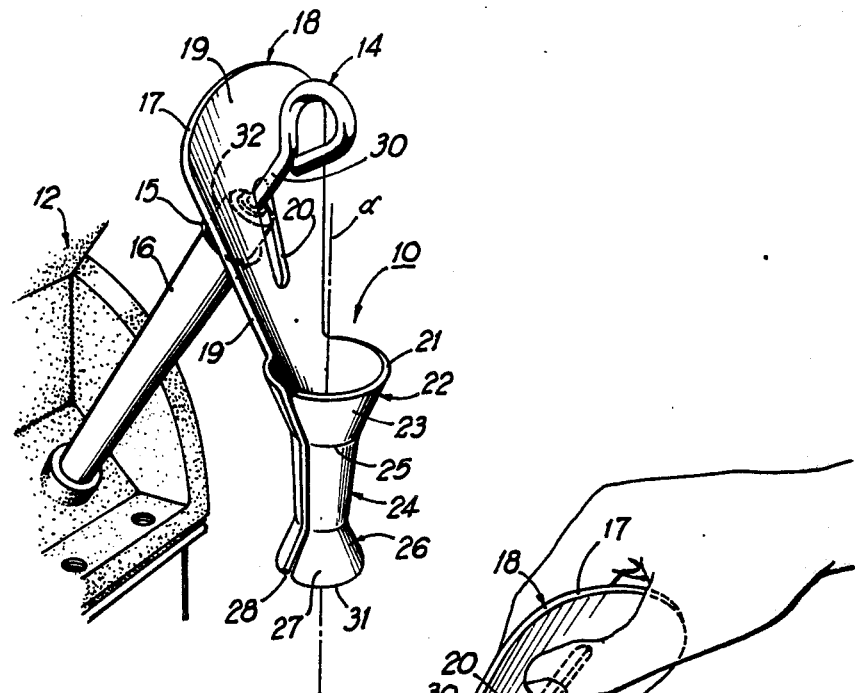
FIG. 1 is a fragmentary perspective view of of portion of a conventional internal combustion engine having a dipstick inserted into a dipstick tube and a dipstick guide being constructed in accordance with the present invention and received on the dipstick.
Figure 2:
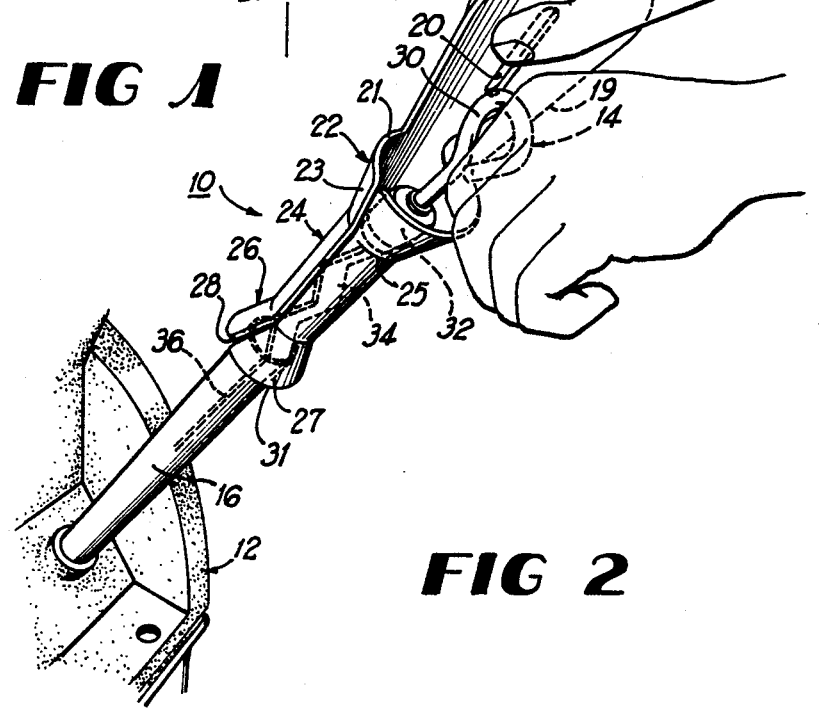
FIG. 2 is a perspective view of the dipstick guide of FIG. 1 being positioned on the dipstick tube and the dipstick is being guided through the dipstick guide into the dipstick tube.
Figure 3:
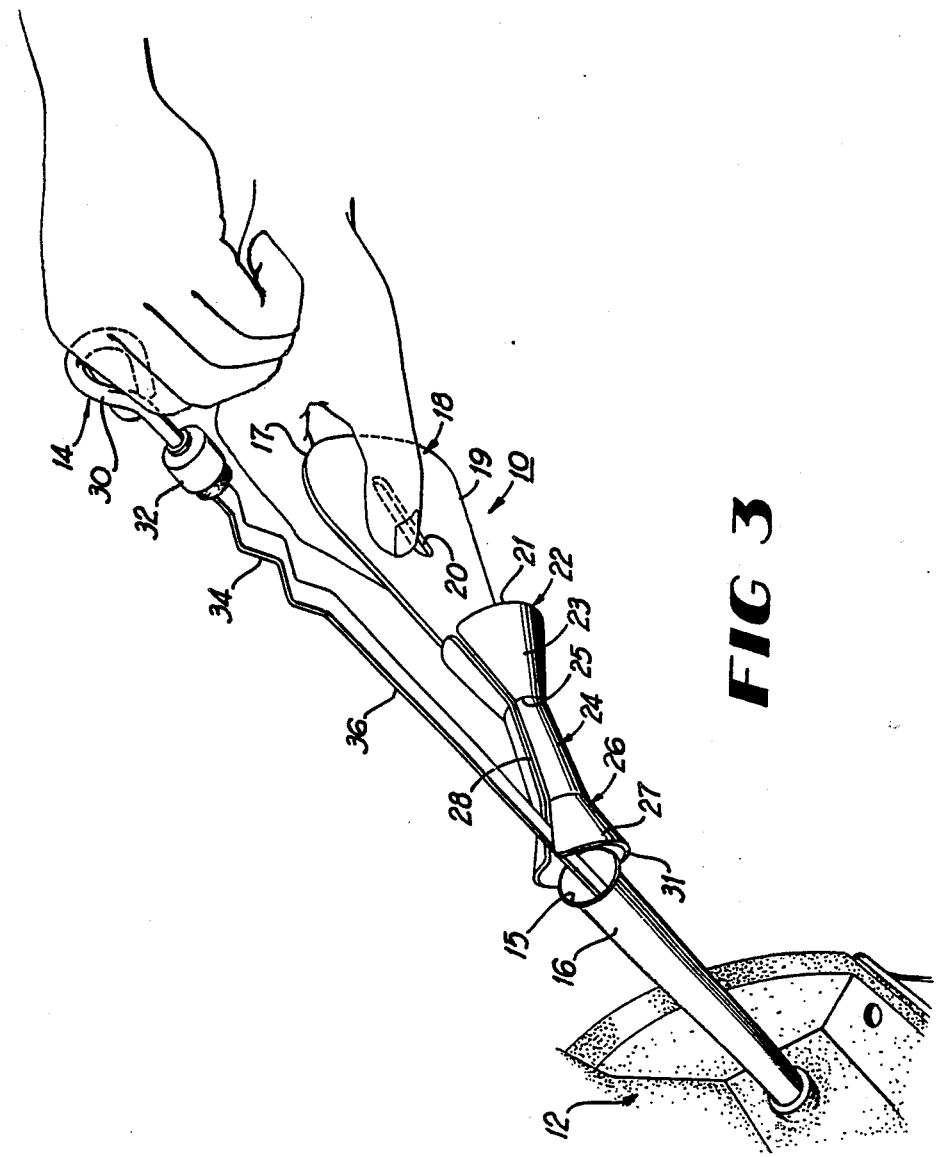
FIG. 3 is a fragmentary perspective view similar to FIG. 2 and showing the dipstick guide being removed from the dipstick tube as the dipstick is partially inserted into the dipstick tube.

Referring now to FIGS. 1-3 which represent in detail, the embodiment chosen for the purpose of illustrating the present invention, the dipstick guide of the present invention is denoted generally by the numeral 10. In FIG. 1, the guide 10 is illustrated as hanging from a conventional dipstick 14 which is received within a dipstick tube 16 extending from the wall of an internal combustion engine denoted generally by the numeral 12. The dipstick 14, is conventional having a loop forming a handle 30 at one end, a cap 32 immediately below the handle 30 which fits over, engages and removeably closes the upper end of dipstick tube 16. When the dipstick 14 is fully inserted into the mouth 15 of dipstick tube 16 to its normal closed position, a crimped portion 34 immediately below the cover or cap 32, contacts the inner wall of the dipstick tube 16 so as frictionally to hold the dipstick 14 in the dipstick tube 16 in its normal closed position. The dipstick 14 also has a long, flexible, straight, flat shank or body 36 which extends down through the dipstick tube 16 and into the oil reservoir (not shown) allowing the measurement of the engine oil level. The cover 32 also functions as a stop which dictates the distance to which the dipstick 14 can be inserted into the diPstick tube 16 and determines the proper depth of penetration of the dipstick into the oil, itself, in the pan, reservoir or sump of the engine 12 so as to measure properly the level of oil in the engine 12.

According to the present invention, the dipstick guide 10 includes an upstanding guide handle 18 which is thin curvilinear plate throughout its length, the handle 18 having a rounded or arcuate convex upper edge 17, the ends of which curve inwardly and downwardly to merge into the straight, downwardly converging opposed side edges 19. In the central portion of the handle 18 is a longitudinally extending slot 20 which is adapted to receive the upper end portion of the dipstick 14, when the dipstick is inserted over the dipstick handle 30 and onto the dipstick tube 16, whereby the dipstick provides temporary support for the dipstick guide 10, as illustrated in FIG. 1.

The lower end portion of the guide handle 18 in integrally joined to and merges into a portion of the upper, radially disposed, peripheral rim 21 which forms the mouth or entrance opening of the upper body 22 of the guide 10. The upper body 22 has a downwardly converging, frusto-conical side which is symmetrical about a main or vertical axis $\alpha$ of the dipstick guide 10. The handle 18 has a curvature corresponding to the slope and curvature of the side 23 of upper body 22. The lower end portion 25 of body 22 forms a small exit opening and is integrally connected to upper peripheral edge of a hollow, cylindrical, tubular shank or central body 24, the upper edge of the shank 24 and the lower edge of the upper body 22 forming a common edge 25 concentric about axis $\alpha$. The normal diameter of the shank 24 is slightly less than the outside diameter of the dipstick tube 16. Furthermore, the diameter of the rim 21 of the upper body 22 is larger than the inside or outside diameter of the shank 24. Also, the diameter of the shank 24 is substantially larger than the largest dimension of the central body 36 of the dipstick 14.

At the lower end of the neck or central body 24 is an outwardly flaring skirt denoted generally by the numeral 26. This skirt 26 has a downwardly diverging frusto-conical side 27, having an upper edge which merges with the lower edge of the shank or central body 24 to form a common edge. The flared skirt 26 thus protrudes downwardly from the lower portion of the shank or central body 24 and terminates in a lower terminal circular rim or edge 31 which is of a larger diameter than the common edge. Thus, the skirt 26 diverges downwardly from the shank or central body 24, and the lower rim 31 is substantially larger in diameter than the outside diameter of the mouth or upper rim 15 of the dipstick tube 16.

In the present invention, the dipstick guide 10 is provided with an axial slot 28, throughout its length, the slot being offset circumferentially from handle 18, as best seen in FIG. 2. Preferably the offset of the slot 28 from the handle 18 should be approximately 90° so that the dipstick guide 10 can be held by its handle 18 in one hand, as the dipstick 14 is inserted through the guide, while being held in the other hand. The width of the slot 28 should be greater than the thickness of the body of the dipstick 14 so that the dipstick guide 10 can be stripped from the dipstick 14 after the body of the dipstick 14 has been partially inserted into the dipstick tube 16, as illustrated in FIG. 3. In use, the dipstick guide 10 is inserted onto the end portion of the dipstick tube 16 after the dipstick 14 has been removed. The lower skirt 26 of the dipstick guide 10, due to its flaring configuration will readily align the dipstick guide 10 on the end 15 of the dipstick tube 16, once the dipstick guide 10 has been generally placed over the upper end 15 of the dipstick tube 16. Thereafter, the dipstick guide 10 which is held in a person's hand by the handle 30 can be urged downwardly, thereby deforming the central body 24 of the dipstick guide 10 outwardly so that the central body or shank 24 of the dipstick guide 10 will yieldably be expanded in diameter by the dipstick tube 16 and be received and frictionally held in place overlapping a portion of the upper end of the dipstick tube 16. In such a position, the dipstick guide 10 is supported by the end portion of the dipstick tube 16 in a coaxial relationship to the dipstick tube 16, thereby forming a telescoping assembly.

In another mode of operation, the dipstick 14 is removed from the dipstick tube 16 and any oil on the dipstick 14 is wiped off with a cloth. The dipstick guide 10 is then placed over the mouth or opening 15 of the dipstick tube 16 by placing and engaging the inner surface of the skirt 26 of the dipstick guide 10 over opening 15. This aligns the central body 24 and the dipstick tube 16. Since the lower edge 31 of the skirt 26 has a diameter larger than the dipstick tube 16, the guide 10 is easy to position physically on the dipstick tube 16. Furthermore, as the diameter of the neck or central body 24 is smaller than the dipstick tube 16, the guide 10 will rest on the dipstick tube 16 and not shift or slide down it.

In either manner of use, the dipstick 14 is inserted into the larger upper mouth 22 of the dipstick and urged downwardly through the guide 10. The downwardly converging side of the upper body 22 guides the dipstick 14 into the neck 24 and thence into the opening 15 of the dipstick tube 16. When the dipstick 14 is inserted partially into the dipstick tube 16, the dipstick guide 10 is raised away from and off of the opening 15 of the dipstick tube 16 and then stripped from the dipstick 14 by aligning the slot 28 with the the flat portion 36 of the dipstick 14 and then moving the guide laterally or radially away from the dipstick 14 so that the flat portion of the dipstick passes through the slot 28. With the dipstick guide 10 out of the way, the dipstick 14 can then be fully inserted into the dipstick tube 16 so as to detect the level of oil in the engine.

The dipstick 14 now can be removed from the engine and the dipstick tube 16 and the oil level of the engine can be ascertained in the conventional manner. To replace the dipstick 14 in the dipstick tube 16 in the engine after reading the oil level, one repeats the steps outlined above.

In another alternative method for using the dipstick guide 10, the dipstick 14 is removed from the dipstick tube 16 and any oil on the dipstick 14 is wiped off with a cloth. The dipstick guide 10 is then placed over the opening 15 of the dipstick tube 16 by placing the skirt or lower body 26 over the mouth of the tube 16 and engaging the inner surface of the lower body or skirt 26 over opening 15. The dipstick 14 is then inserted into the upper body 22 of the dipstick guide 10. The downwardly converging sides of the upper body 22 guide the dipstick 14 into the neck 24 and into the opening 15 of the dipstick tube 16.

Now, instead of removing the dipstick guide 10 from the dipstick tube 16 and the dipstick 14 as described in the above, one may force the dipstick guide 10 down onto the dipstick tube 16. As the dipstick guide 10 is made from a material such as sheet metal or plastic which is yieldable within elastic limits, the dipstick guide 10 will expand when forced down upon the larger diameter of dipstick tube 16, opening and widening slot 28. When the dipstick guide 10 is forced far enough down on the dipstick tube 16, it will not interfere with the full insertion of the dipstick 14 into the dipstick tube 16. Cover 32 is now able to engage the opening 15 of the dipstick tube 16 without contacting the dipstick guide 10, and the dipstick 14 will be in the proper position so its lower end will be in the oil reservoir.

After the dipstick 14 has been inserted to its full extent in dipstick tube 16, it can be removed so as to ascertain the level of il in the engine. When it is desired to replace the dipstick 14 in the dipstick tube 16, one raises the dipstick guide 10 up off of the dipstick tube 16 so that the dipstick guide 10 is in its original position, i.e., with the inner surface of the lower mouth 26 contacting the opening 15 of the dipstick tube 16. The dipstick 14 now can be reinserted into the dipstick tube 16 by first inserting the dipstick 14 into the upper body 22 whose downwardly converging sides guide the dipstick into neck or tube 24 and into the opening 15 of the dipstick tube 16. When the dipstick 14 is inserted partially into the dipstick tube 16, the dipstick guide 10 is raised off of the opening 15 of the dipstick tube 16 and removed from the dipstick 14 by passing the dipstick guide 10 over the flat portion 36 of the dipstick 14 by means of slot 28, as described above. With the dipstick guide 10 out of the way, the dipstick 14 is then fully inserted into the dipstick tube 16 to be in its normally closed position.

The dipstick guide 10 includes a hole 20 for the purpose of hanging the dipstick guide 10 for storage. For example, when working on the engine, one can hang the dipstick guide 10 on the dipstick 14 by passing the dipstick handle 30 through the hole 20 and letting the dipstick guide 10 hang pendent on the dipstick 14. Alternatively, the hole 20 can be engaged over a nail or hook located on a garage or other wall.

The width of the handle 18 is substantially less than the length of a person's hand so that the tapering edges 19 of the handle 18 can be held by a hand without slipping if the guide is greasy.

The guide 10 is also useful as a funnel when additives are to be added to the oil. Usually, these additives are in small bottles which may not be readily poured through the oil fill hole. When used as a funnel, the guide 10 should be fitted onto the end portion of the tube 16, with the slot 28 in an up position. The additive should then be poured slowly, so that none spills through the slot.

It will be obvious to those skilled in the art that many variations may be made in the embodiments chosen for the purpose of illustrating the best mode of making and using the present invention without departing from the scope thereof as defined by the appended claims.

What is claimed is:

1. An apparatus for guiding a dipstick into an outer end of a dipstick tube comprising: an upper body having converging side portion defining an open mouth at one end and, a smaller opening at its other end, said smaller opening being sufficiently large that a stem of said dipstick can pass therethrough, a hollow tube connected by one end to said other end of said upper body, and there being provided a slot extending through a side portion of said body and said tube from said mouth of said upper body to an outer end portion of said hollow tube, said slot being sufficiently wide that the stem of said dipstick will pass through said slot, the outer end portion of said hollow tube being adapted to be received on the outer end of said dipstick tube.

2. The apparatus defined in claim 1 wherein said side portion of said upper body is frusto-conical in shape.

3. The apparatus defined in claim 2 wherein said hollow tube is cylindrical and is expandable and has a diameter when expanded which is greater than the external diameter of said dipstick tube.

4. The apparatus defined in claim 1 further comprising a skirt extending downwardly and outwardly from the end of said hollow tube, said slot extending throughout the length of said skirt.

5. The apparatus of claim 4 wherein said skirt is frusto-conical in shape.

6. The apparatus defined in claim 5 wherein said mouth and said hollow tube are each circular and the diameter of said mouth is greater than the diameter of said hollow tube.

7. The apparatus of claim 4 wherein the diameter of said hollow tube is smaller than the diameter of said dipstick tube.

8. The apparatus defined in claim 1 wherein said hollow tube is cylindrical and said mouth of said body is circular, the diameter of said mouth being greater than the diameter of said hollow tube and the diameter of said hollow tube being approximately equal to or slightly less than the outside diameter of said dipstick tube, said hollow tube being resilient to that when fitted over the end portion of said dipstick tube it will yieldably frictionally engage the outer surface of said dipstick tube.

9. The apparatus of claim 4 further comprising a handle extending outwardly from the upper edge of said mouth.

10. The apparatus of claim 4 wherein said hallow tube is of sufficient flexibility to expand within elastic limits sufficiently to be received over the end portion of said dipstick tube.

11. An apparatus for guiding a dipstick into an outer end of a dipstick tube comprising: an upper body having converging side portion defining an open mouth at one end and a smaller opening at its other end, said smaller opening of said upper body being sufficiently large that a stem of dipstick can pass therethrough and a skirt flaring downwardly and outwardly from said other end of said body, said skirt having a smaller opening and larger opening and means connecting said smaller opening of said upper body and said smaller opening of said flaring skirt, there being provided a slot extending through a side portion of said body and a side portion of said skirt and said means, from said mouth to said larger opening of said skirt, said slot being sufficiently wide that the stem of said dipstick will pass through said slot.

* * * * *